US007103208B2

United States Patent
Wengender et al.

(10) Patent No.: US 7,103,208 B2
(45) Date of Patent: Sep. 5, 2006

(54) DETECTING AND CLASSIFYING BLEMISHES ON THE TRANSMISSIVE SURFACE OF AN IMAGE SENSOR PACKAGE

(75) Inventors: Timothy G. Wengender, Webster, NY (US); Paul D. Conaway, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 721 days.

(21) Appl. No.: 10/229,190

(22) Filed: Aug. 26, 2002

(65) Prior Publication Data

US 2004/0037457 A1 Feb. 26, 2004

(51) Int. Cl.
*G06K 9/00* (2006.01)

(52) U.S. Cl. ............ 382/141; 382/224; 382/312; 356/237.1; 438/51

(58) Field of Classification Search ............ 382/141, 382/151, 170, 172, 190, 199, 218, 224, 254, 382/264, 276, 312; 250/208.1, 216, 559.45; 348/276; 359/891; 356/237.1; 438/51; 358/461
See application file for complete search history.

(56) References Cited

U.S. PATENT DOCUMENTS

| | | | | |
|---|---|---|---|---|
| 3,971,065 A | | 7/1976 | Bayer | 348/276 |
| 4,343,021 A | * | 8/1982 | Frame | 348/247 |
| 4,590,520 A | * | 5/1986 | Frame et al. | 348/616 |
| 5,017,863 A | * | 5/1991 | Mellitz | 324/751 |
| 5,633,734 A | * | 5/1997 | Lathrop et al. | 358/530 |
| 5,760,829 A | * | 6/1998 | Sussmeier | 348/187 |
| 5,760,834 A | * | 6/1998 | Rostoker | 348/340 |
| 5,969,372 A | * | 10/1999 | Stavely et al. | 250/559.42 |
| 5,977,535 A | * | 11/1999 | Rostoker | 250/208.1 |
| 6,061,086 A | * | 5/2000 | Reimer et al. | 348/125 |
| 6,734,997 B1 | * | 5/2004 | Lin | 358/487 |

OTHER PUBLICATIONS

"Solid-State Imaging with Charge-Coupled Devices" by Albert Theuwissen.

* cited by examiner

*Primary Examiner*—Sheela Chawan
(74) *Attorney, Agent, or Firm*—Raymond L. Owens (57) ABSTRACT

A method for determining blemishes in or on the transmissive surface of an image sensor package and determining if such blemishes are acceptable for use of the image sensor package including capturing a digital image of a predetermined scene using the image sensor package and storing such digital image in a memory, identifying blemishes formed in or on the transmissive surface by processing the digital image data using a series of image processing functions, and classifying the blemishes from the digital image and determining if the image sensor package is acceptable for use.

11 Claims, 6 Drawing Sheets

DETECTING AND CLASSIFYING BLEMISHES ON THE TRANSMISSIVE SURFACE OF AN IMAGE SENSOR PACKAGE

CROSS REFERENCE TO RELATED APPLICATIONS

Reference is made to commonly assigned U.S. patent application Ser. No. 10/100,723 filed Mar. 19, 2002 by Timothy G. Wengender, et al., the disclosure of which is incorporated herein by reference.

FIELD OF THE INVENTION

The present invention relates to determining if an image sensor package has scratches, digs, and dirt in or on the transmissive surface of such package that cause the image sensor package to be either acceptable or unacceptable for use.

BACKGROUND OF THE INVENTION

There are a couple different types of image sensor packages. Types of image sensor packages include CCD image sensor packages and CMOS image sensor packages. In the preferred embodiment, a full frame CCD sensor is studied and used for the purpose of explaining how to detect scratches, digs, and dirt. A full frame image sensor is basically a two dimensional array of pixel sensing elements. Full frame CCD image sensors capture light and store the resulting signal electrons in the individual pixel sensing elements. The pixels are vertically shifted down each column in parallel by one row, with the last row being shifted out and filling a horizontal shift register. These pixels in the horizontal shift register are then shifted out one at a time (serially) until the horizontal shift register is completely empty. At this time, the sensor is ready to fill the horizontal shift register again, and the process of parallel to series shift explained above is repeated one row at a time until all rows of the sensor have been transported out of the sensor. The output pixels are then reconstructed to form a digital image that can be processed and analyzed for scratches, digs, and dirt.

In typical image sensor packages, there is a transmissive surface that protects the image sensor and often has coatings on it for the purpose of cutting down on reflectance or blocking infrared radiation. If this transmissive surface contains blemishes that obstruct or distort light coming through it, then the resulting image is of a lesser quality. These blemishes are classified into three different types: dirt, which can be removed by cleaning; scratches, which are usually long and narrow; and digs, which are usually small and more circular in nature. These blemishes are characteristics of the transmissive surface that is attached to and covers the image sensor. The shadows cast by these blemishes appear on the sensor elements when the incoming light passes through the transmissive surface, and thus appear on the resulting image. Scratches, digs, and dirt are typically created during the handling and packaging in the manufacturing process of the image sensor packages, but are also created later during the assembly in the final product, such as a digital camera. A certain level of corruption in digital image would be acceptable. In the past, the detection of blemishes on the transmissive surface has been done under a microscope or by viewing an image of the transmissive surface on a screen. These techniques are subjective, time consuming, and inaccurate.

These blemishes are different from the corrupted data classified as pixels, columns, and defective cluster pixels as referenced in U.S. patent application Ser. No. 10/100,723 filed Mar. 19, 2002 by Timothy G. Wengender, et al, the disclosure of which is incorporated herein by reference. The way in which corrupted data is differentiated is through focusing or defocusing the lens aperture 51. To detect sensor defects such as pixels, columns, or clusters, the lens aperture 51 is defocused as much as possible by placing the aperture at it's minimum setting (a small f-number is a large diameter aperture). At this setting the light that passes through the transmissive surface is diffused and any scratches, digs, or dirt are blurred and become unnoticeable on the image sensor package. To detect scratches, digs, or dirt, the lens aperture 51 is focused by placing the aperture at or near it's maximum setting (a large f-number is a small diameter aperture). At this setting, the light that passes through the transmissive surface is not diffused and any scratches, digs, or dirt are focused and become noticeable on the image sensor.

Such scratches, digs, or dirt will cause corrupted data in the digital image after it is read out of the image sensor package. To produce the highest quality image, the scratches, digs, or dirt need to be identified during the manufacturing and assembly process so that image sensor packages can be accepted or rejected in the final assembly.

SUMMARY OF THE INVENTION

It is therefore an object of the present invention to provide an improved method of determining if the blemishes on the transmissive surface of an image sensor package are within an acceptable range. The present invention facilitates the removal of dirt blemishes which otherwise would have caused the rejection of the image sensor package.

This object is achieved by a method for determining blemishes in or on the transmissive surface of an image sensor package and determining if such blemishes are acceptable for use of the image sensor package, comprising the steps of:

a) capturing a digital image of a predetermined scene using the image sensor package and storing such digital image in a memory;

b) identifying blemishes formed in or on the transmissive surface by processing the digital image data using a series of image processing functions; and c) classifying the blemishes from the digital image and determining if the image sensor package is acceptable for use.

ADVANTAGES

It is an important advantage of the present invention to determine and classify scratches, digs, and dirt objectively so that the sensor is either accepted or rejected for use in a digital camera.

A feature of the invention is the provision of a method that quickly, accurately, and automatically identifies scratches, digs, and dirt in an image sensor package.

DETAILED DESCRIPTION OF THE INVENTION

In accordance with the present invention, a method is set forth for determining and classifying one or more scratches, digs, and dirt in a full frame image sensor package. The image sensor package can include a CCD or CMOS image sensor.

Figure 1A:
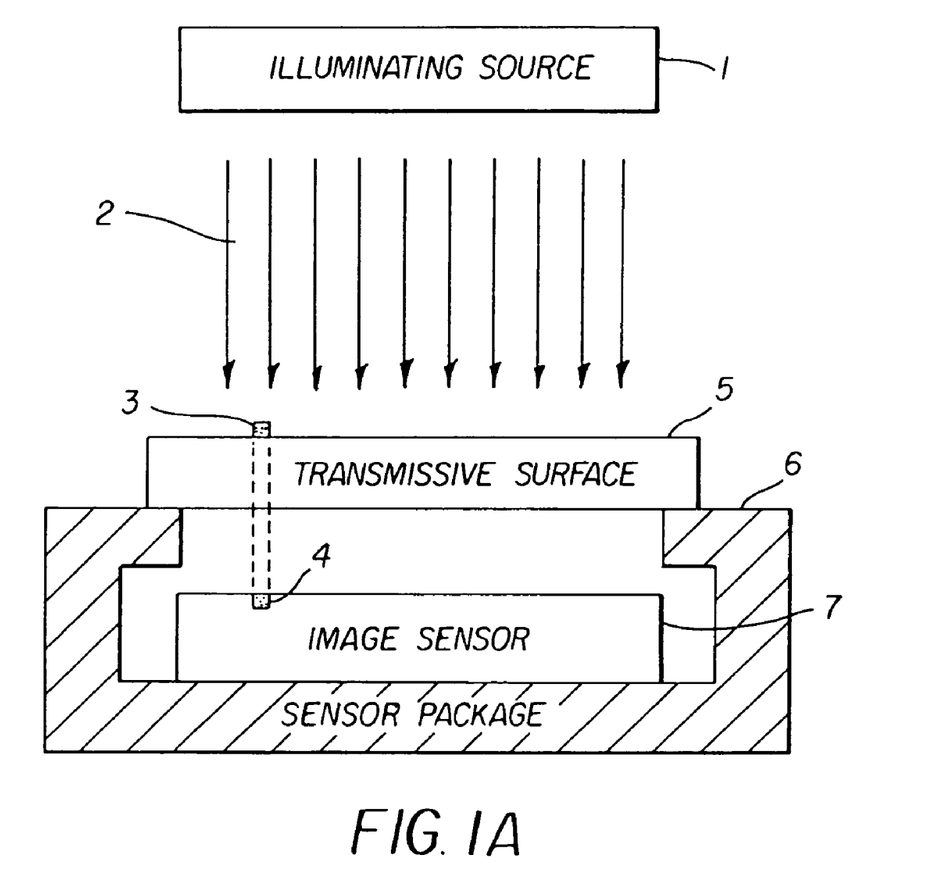
FIG. 1A is a schematic of a light source and cross section of an image sensor package including a transmissive surface, which can contain blemishes.

FIG. 1A depicts a schematic to represent the way in which a blemish is formed on an image sensor package. An illuminating source shown in block 1 emits light rays as shown in block 2. The light rays travel through a transmissive surface 5 and are blocked by a blemish, which can be a scratch, dig or dirt, in block 3 which is located on the transmissive surface 5. The light continues on to an image sensor 7 located inside a sensor package 6. The light that was blocked by the blemish 3 casts a shadow 4 on the image sensor 7. The shadow in block 4 is depicted in the corrupted pixels of a digital image as shown in FIG. 1B.

Figure 1B:
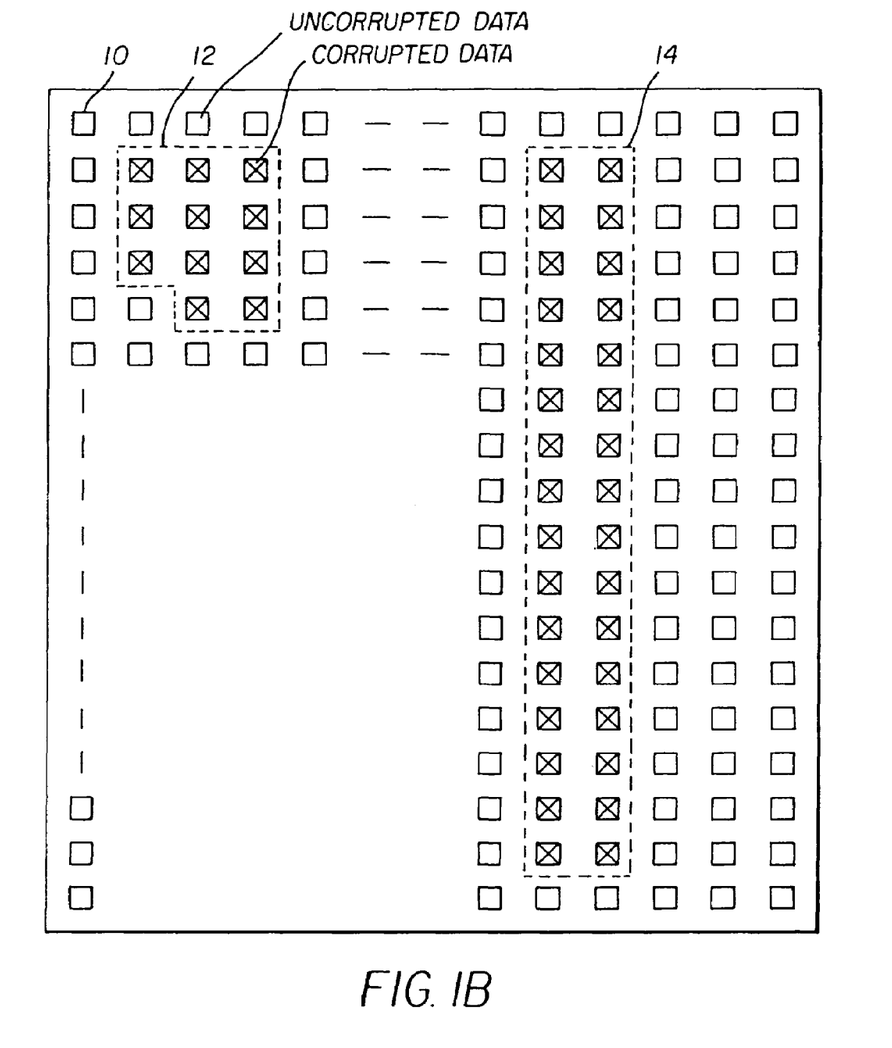
FIG. 1B is a schematic diagram that shows examples of types of scratches and digs that can be found in a digital image produced by an image sensor package.

FIG. 1B depicts a schematic diagram to represent the different types of scratches or digs observable in an image sensor package, such as a full frame image sensor package. For a more detailed description of the operation and structure of CCD image sensor packages, refer to *Solid-State Imaging with Charge-Coupled Devices* by Albert J. P. Theuwissen.

FIG. 1B depicts an image sensor package with both uncorrupted pixels and corrupted pixels. A normal pixel with uncorrupted data is shown in block 10. Pixels with corrupted data are shown in block 12 and block 14. As shown by blocks 12 and 14, the corrupted data appear in different shapes and sizes. Block 12 depicts corrupted data classified as a dig, and block 14 depicts corrupted data classified as a scratch. The classification for the corrupted data is determined by the area of the corrupted data and the elongation factor as described later for FIG. 5.

Figure 2:
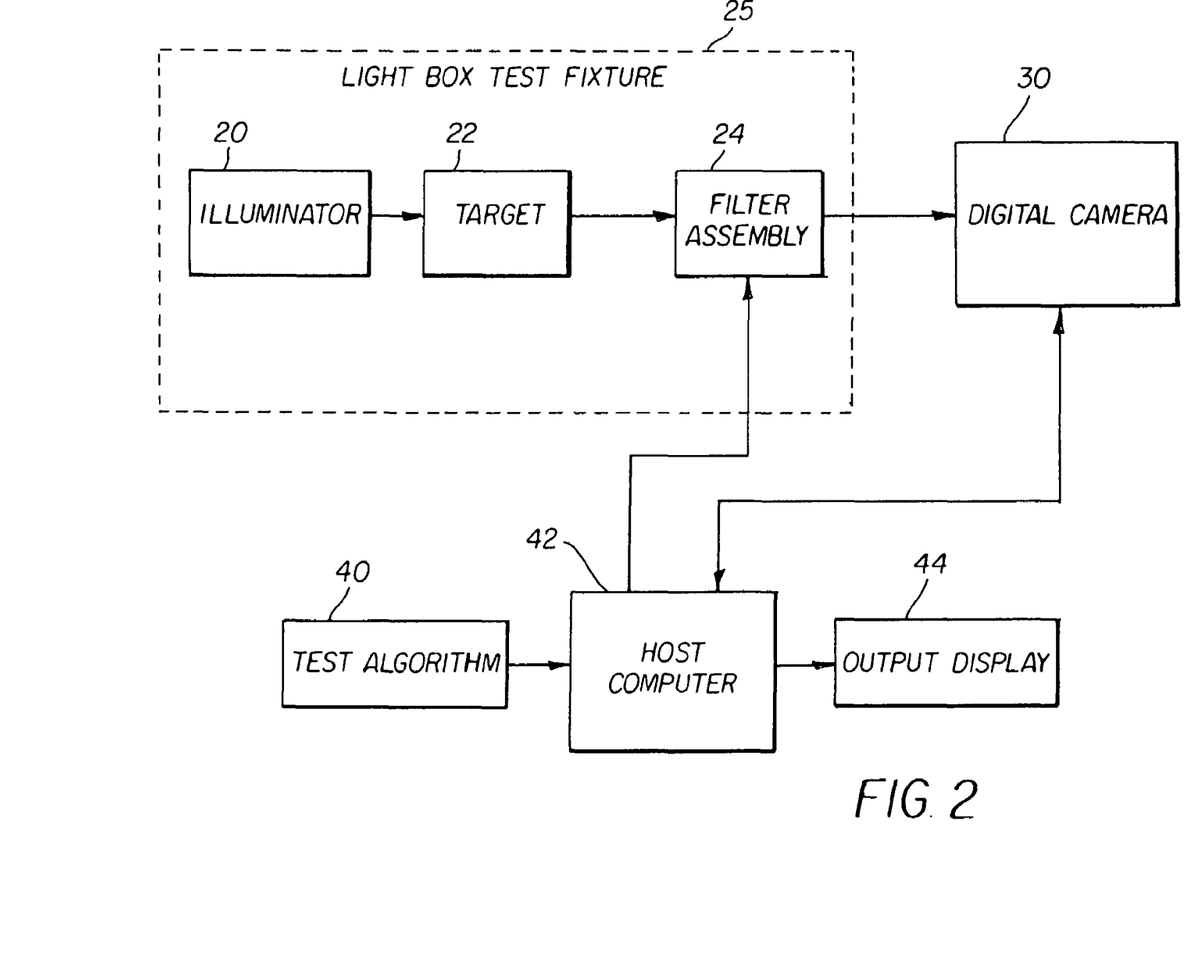
FIG. 2 is a block diagram of a test system for testing an image sensor package in accordance with the present invention for automatically identifying corrupted data in a digital image.

Turning now to FIG. 2, a representative test system is used to acquire an image, process the image, and identify corrupted data. The test system includes an illumination source 20, which directs light through a transparent diffuse target 22 used to produce a flat field image. The light intensity is regulated through a filter assembly 24 including several neutral density filters. Filter selection is controlled by a host computer 42. Parts 20, 22, and 24 are all enclosed in a light box test fixture 25 to block unwanted light interference from the outside. The flat field image produced in the light box test fixture 25 is captured and processed by a digital camera 30 (described later). The digital camera 30 is automatically controlled by the host computer 42. The host computer 42 controls both the capture and retrieval of the image from the digital camera 30 via an electrical interface, such as one made in accordance with the well known IEEE 1394 (Firewire) standard.

Once the image has been retrieved from the digital camera 30, a test algorithm 40 (described later), which has been input to the host computer 42 prior to the beginning of the test, is used to process and analyze the image. The host computer 42 determines the defect map and correction pixels according to the test algorithm 40 and lists the results on the output display 44.

Figure 3:
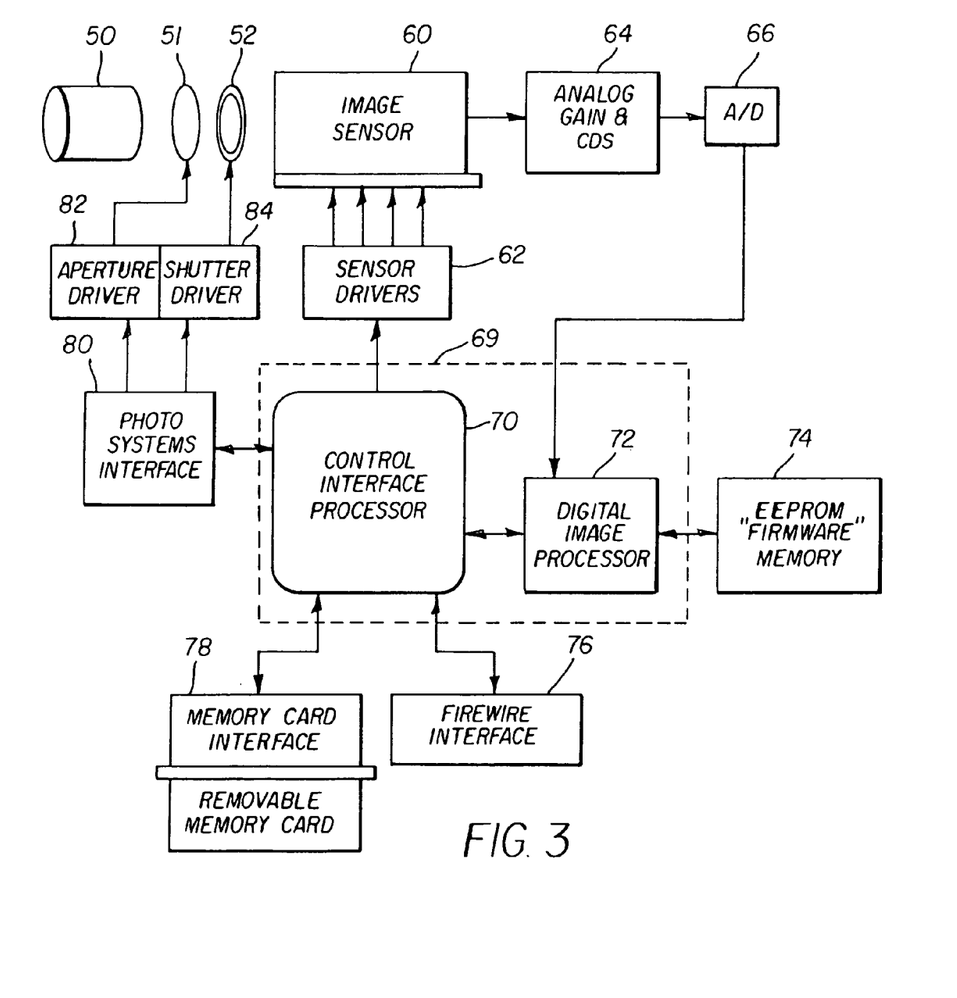
FIG. 3 is a block diagram of a digital camera, which can be used to capture the image as shown in the test system of FIG. 2.

FIG. 3 depicts a block diagram of a digital camera used to capture an image produced by the test system of FIG. 2 described above. As stated above, the host computer 42 automatically controls the operation of the digital camera 30. The host computer 42 sends the digital camera 30 a series of commands via Firewire interface 76 in accordance with the IEEE 1394 standard. The control interface processor 70 interprets these commands and in turn sends commands to a photo systems interface 80, which sets the exposure control parameters for the digital camera 30. Connected to the photo systems interface 80 are an aperture driver 82 and a shutter driver 84. The camera includes an optical lens 50, which receives the incoming light. Through the aperture driver 82 and the shutter driver 84, aperture 51 and shutter 52 are controlled, respectively, and allow the incoming light to fall upon the full frame image sensor package 60. The image sensor package 60, which may be a KAF-16801CE image sensor package manufactured by Eastman Kodak Company, Rochester, N.Y., is clocked by the sensor drivers 62. The output of the image sensor package 60 is amplified and processed in a CDS (correlated double sampling circuit) 64 and converted to a digital form in an A/D converter 66. The digital data is transferred to processor section 69, which includes a digital image processor 72 that utilizes instructions stored in EEPROM Firmware memory 74 to process the digital image. Finally, the processed digital image is stored using a memory card interface and removable memory card 78, which can be made in accordance with the well known PCMCIA 2.0 standard interface, or the image is transferred back to the host computer 42 shown in FIG. 2 via the Firewire interface 76.

Figure 4:
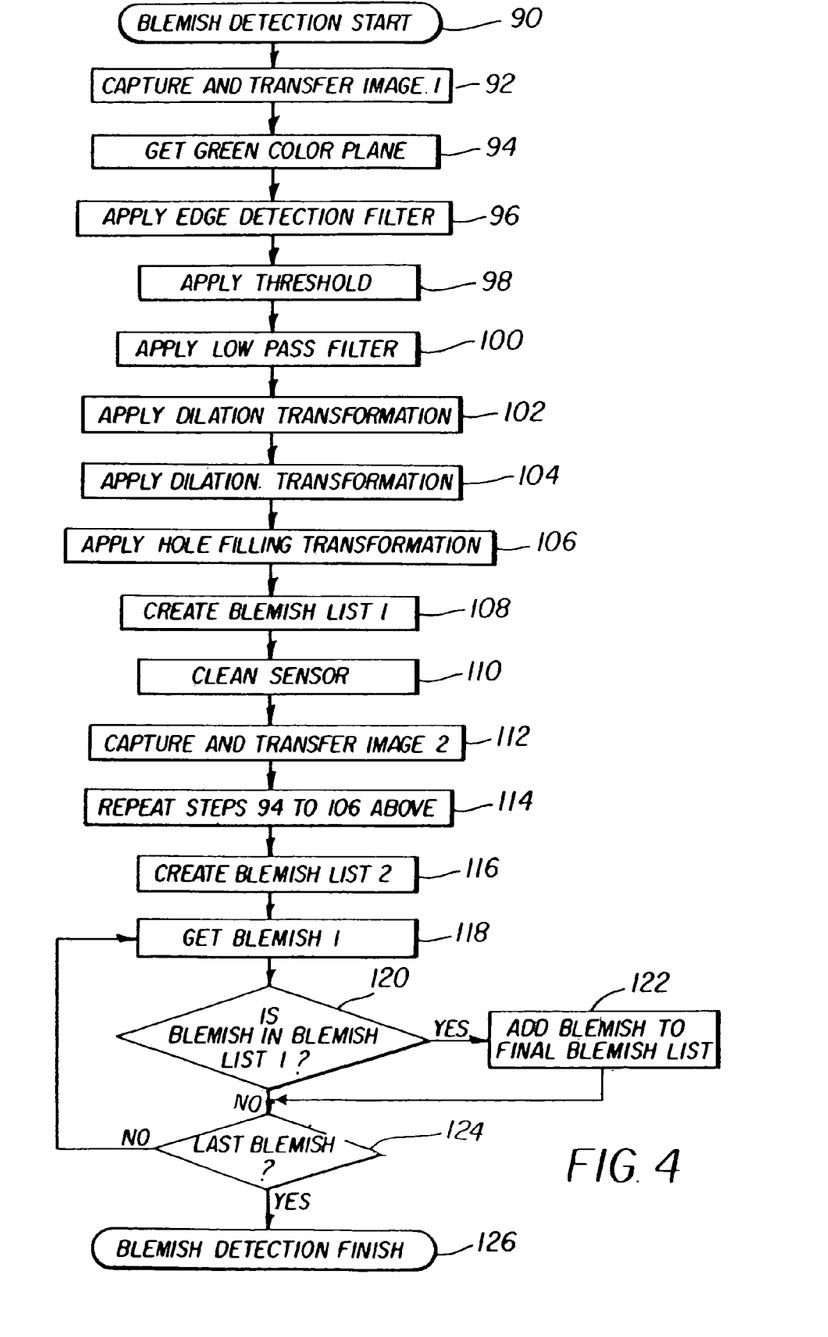
FIG. 4 is a block diagram used in the system of FIG. 2 for determining the scratches, digs, and dirt and creating a blemish list.

The present invention provides an automated test method for effectively detecting scratches, digs, and dirt in the image sensor package 60 and determining if such blemishes are acceptable. FIG. 4 depicts a flowchart of a preferred embodiment for operating the system of FIG. 2 to detect scratches, digs, and dirt. The test starts in block 90 when the digital camera 30 is connected to the host computer 42, and properly positioned relative to the light box test fixture 25.

In block 92 an image is captured with the digital camera 30 with a full frame sensor on a flat field target. Also in block 92 the image is transferred from the digital camera 30 as described above to the host computer 42, where the analysis of the image takes place. The scratches, digs, and dirt are typically darker than the surrounding image. For this reason, it is preferred to have an image taken at high exposure level. As mentioned earlier in the Background of the Invention, the lens aperture 51 is set at or near the maximum setting to focus the scratches, digs, and dirt.

Since the image sensor package 60 uses a color filter array (CFA), such as the Bayer CFA pattern shown in commonly assigned U.S. Pat. No. 3,971,065, and the color pixel values have not been interpolated, there will be four color planes. In the preferred embodiment, the host computer 42 extracts only the pixels from the green color plane for processing in block 94. The pixels from the red or blue planes could be extracted and used for processing, but this is unnecessary since only the pixels from one color plane are needed to identify and classify scratches, digs, and dirt.

Next, a series of image processing functions are applied to the extracted image. First, an edge detection filter is applied in block 96 to highlight the contours of the scratches, digs, and dirt. There are several methods for detecting edges. In the preferred embodiment, a Sobel filter is used because it is robust with regard to the overall illumination level and gradual changes in light level, and because it does not favor any particular direction. Next in block 98, the extracted image is compared to a threshold. Any pixels in the image within a predetermined intensity range are set to one value such as one and pixels outside that range are set to zero. The resulting output after applying the threshold is an image where each pixel either equals zero or one, commonly referred to as a binary image.

In the preferred embodiment, the lower threshold is 4 and the upper threshold is 30. The regions where many neighboring pixels equal one are referred to as blobs for further discussion. Then in block 100 a low pass filter is applied to the binary image to eliminate all the small, unconnected blobs, since individual pixels are not of interest for scratches, digs, and dirt detection. Then the image is dilated in blocks 102 and 104 in order to grow all blobs by one pixel (or more) in all directions. If two blobs now merge into one, it is most likely that the two blobs are actually part of one blemish. The final image processing step in this part of the algorithm is to fill in any holes in the resulting blobs in block 106. This step will transform a connected ring of blobs into a single continuous one. After this step, the edges, which had indicated only the periphery of a blemish, now become whole representations of the blemish. From the binary image a list of blemishes is made in block 108. Then the sensor is cleaned in block 110 so that another image is captured and transferred in block 112. The reason for a second image is to determine which blemishes in the list of blemishes are dirt. Steps 94 to 106 are repeated for the second image in block 114 and a second blemish list is created in block 116. Then the position of the first blemish in blemish list two is retrieved in block 118 and compared to each blemish position in blemish list one in block 120. If the blemish position is found in the first blemish list, then the blemish is not added to the final blemish list. If it is not found, then the blemish is added to the final blemish list in block 122. In block 124, if the blemish is not the last blemish in the list, the program continues to the next blemish repeating steps 118 to 122, until the last blemish is found and the test ends in block 126.

At this point, a final blemish list of only scratches and digs is available for classification. Dirt is not a permanent characteristic of the transmissive surface and can be removed, therefore it is not included in the blemish list.

Figure 5:
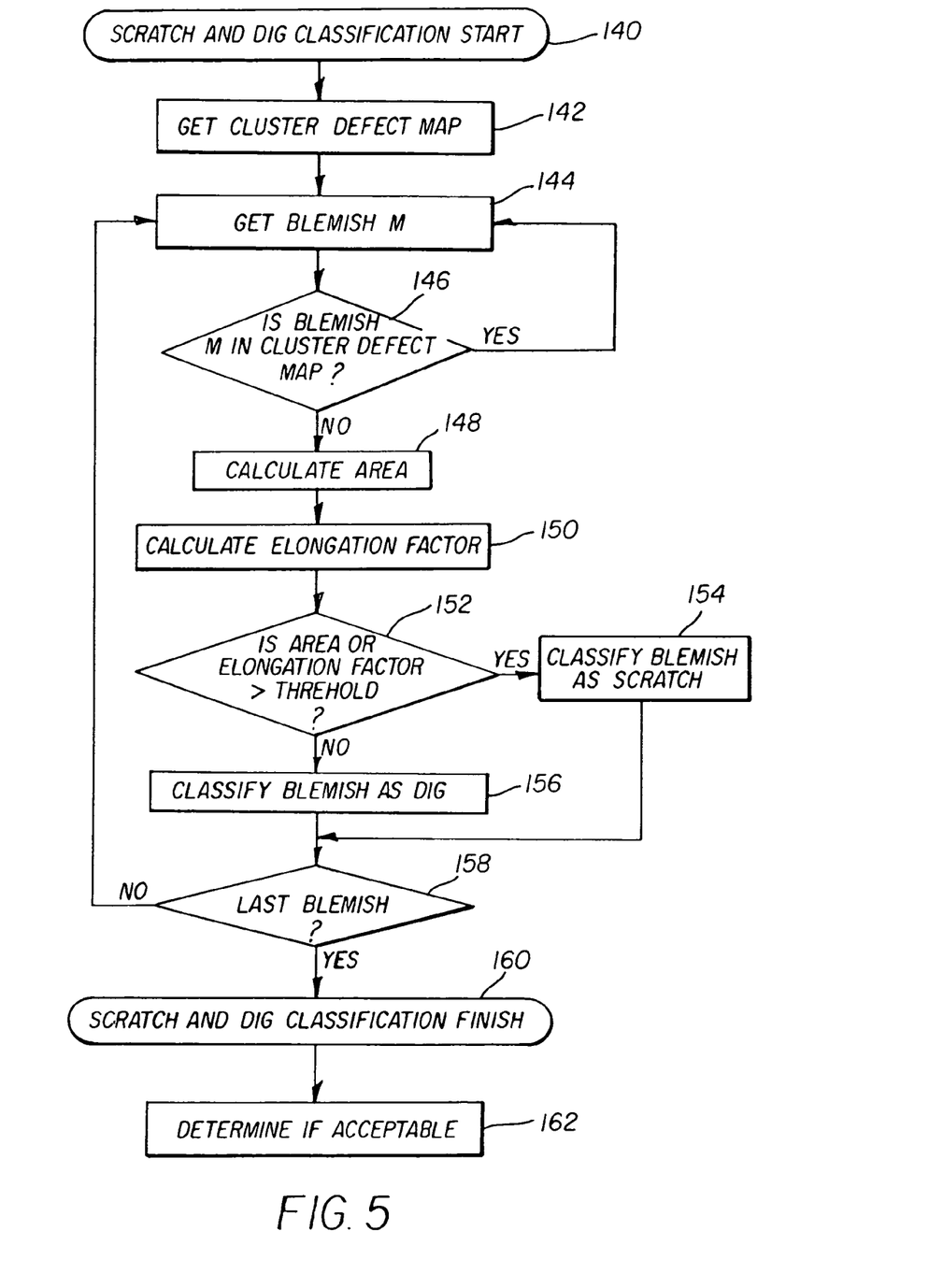
FIG. 5 is a block diagram including the area and elongation factor used to classify the blemish list produced by the block diagram of FIG. 4.

Turning now to FIG. 5, a method for classifying scratches and digs for the blemish list produced from FIG. 4 is performed. The test starts in block 140. A defect map similar to that as shown in FIG. 6, as referenced in U.S. patent application Ser. No. 10/100,723 filed Mar. 19, 2002 by Timothy G. Wengender, et al., the disclosure of which is incorporated herein by reference, is retrieved and the cluster defect pixels are extracted in block 142. Then in block 144 the program retrieves the first blemish form the blemish list produced from the block diagram of FIG. 4. The program then checks to see if the blemish is in the cluster defect map in block 146. If so, the program ignores the blemish and gets the next blemish in block 144. In this way, any blemishes found in the cluster defect map will not be classified as scratches or digs. If the blemish is not found in the cluster defect map, then the program continues. In block 148, the area of the blemish is calculated. Then in block 150 an elongation factor is calculated. The elongation factor is calculated using the following formula:

$$E = M/U \qquad \text{(equation 1)}$$

wherein:

E is the elongation factor;

M is the longest segment within a blemish; and

U is the mean length of the perpendicular segments.

Therefore, the more elongated the shape of the blemish, the greater the longest segment within a blemish, and thus the greater its elongation factor. Using the area and elongation factor just calculated, in block 152 the program checks to see if the area is greater than 200 in the preferred embodiment, or the elongation factor is greater than or equal to 3 in the preferred embodiment. If true, the blemish is classified as a scratch in block 154. If false, the blemish is classified as a dig in block 156. In block 158 the program checks to see if this is the last blemish in the list and, if not, continues on to the next blemish, repeating the process at block 144.

Finally, after the last blemish has been analyzed and classified in block 158, the test finishes in block 160. At this point the blemish list with each blemish and its classification is available on the host computer 42 and displayed on the output display 44. From this classified blemish list, the image sensor package is determined to be acceptable or not acceptable in block 162. In the preferred embodiment, an image sensor package with any scratches that deviate more than 5 percent from their neighbors and digs that deviate more than 10 percent is determined unacceptable.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

| PARTS LIST | |
|---|---|
| 1 | block |
| 2 | block |
| 3 | blemish |
| 4 | shadow |
| 5 | transmissive surface |
| 6 | full frame image sensor package |
| 7 | image sensor |
| 10 | block |
| 12 | block |
| 14 | block |
| 20 | illumination source |
| 22 | transparent diffuse target |
| 24 | filter assembly |
| 25 | light box test fixture |
| 30 | digital camera |
| 40 | test algorithm |
| 42 | host computer |
| 44 | output display |

-continued

PARTS LIST

| | |
|---|---|
| 50 | optical lens |
| 51 | lens aperture |
| 52 | shutter |
| 60 | full frame image sensor package |
| 62 | sensor drivers |
| 64 | CDS (correlated double sampling circuit) |
| 66 | A/D converter |
| 69 | processor section |
| 70 | control interface processor |
| 72 | digital image processor |
| 74 | EEPROM Firmware memory |
| 76 | Firewire interface |
| 78 | memory card interface and removable memory card |
| 80 | photo systems interface |
| 82 | aperture driver |
| 84 | shutter driver |
| 90 | block |
| 92 | block |
| 94 | block |
| 96 | block |
| 98 | block |
| 100 | block |
| 102 | block |
| 104 | block |
| 106 | block |
| 108 | block |
| 110 | block |
| 112 | block |
| 114 | block |
| 116 | block |
| 118 | block |
| 110 | block |
| 120 | block |
| 124 | block |
| 126 | block |
| 140 | block |
| 144 | block |
| 146 | block |
| 120 | block |
| 148 | block |
| 152 | block |
| 154 | block |
| 156 | block |
| 158 | block |
| 160 | block |
| 162 | block |

What is claimed is:

1. A method for determining blemishes in or on the transmissive surface of an image sensor package and determining if such blemishes are acceptable for use of the image sensor package, comprising the steps of:
   a) providing a flat field target image that will emphasize blemishes in or on the transmissive surface;
   b) capturing an image of the flat field target image using the image sensor package;
   c) converting image sensor data produced by the image sensor package into digital image data and storing such digital image data in memory;
   d) identifying blemishes formed in or on the transmissive surface by processing the digital image data using a series of image processing functions; and
   e) classifying the blemishes from the digital image and determining if the image sensor package is acceptable for use.

2. The method of claim 1 further including classifying unacceptable blemishes as dirt based on cleaning the transmissive surface of image sensor package to remove such dirt.

3. The method of claim 1 wherein step e) further includes using area and elongation factors to classify the blemishes as scratches or digs.

4. The method of claim 1 wherein the image processing function includes the steps of:
   i) edge detecting blemishes in the digital image data;
   ii) determining if such detected blemishes are within a predetermined range of a predetermined threshold and changing the digital image data to form thresholded digital image data based upon such threshold range;
   iii) low pass filtering the thresholded digital image data to form low pass filtered digital image data; and
   iv) dilating the low pass filtered digital image data.

5. The method of claim 1 wherein the image sensor package includes a CCD or CMOS image sensor package.

6. A computer program product comprising a computer readable storage medium having a computer program stored thereon for implementing the method of claim 1.

7. A method for determining blemishes including scratches, digs, and dirt in or on the transmissive surface of an image sensor package and determining if such blemishes are acceptable for use of the image sensor package, comprising the steps of:
   a) providing a flat field target image that will emphasize blemishes in or on the transmissive surface;
   b) capturing a first image of the flat field target image using the image sensor package;
   c) converting a first image sensor data produced by an image sensor into a first digital image data and storing such first digital image data in memory;
   d) identifying scratches, digs, and dirt formed in or on the transmissive surface by processing the first digital image data using a series of image processing functions;
   e) cleaning the transmissive surface in response to identified unacceptable blemishes on the transmissive surface;
   f) after step e, capturing a second image of the flat field target image using the image sensor package;
   g) converting image sensor data produced by the image sensor for the second image into a second digital image data and storing such second digital data image in memory;
   h) comparing the second digital image data to the first digital image data to determine if the blemishes were caused by dirt and to determine if other blemishes were caused by scratches and digs in the transmissive surface; and
   i) deciding if the image sensor package is acceptable for use.

8. The method of claim 7 wherein the image processing function used for steps e) and h) includes the steps of:
   i) edge detecting blemishes in the digital image data;
   ii) determining if such detected blemishes are within a predetermined range of a predetermined threshold and changing the digital image data to form thresholded digital image data based upon such threshold range;
   iii) low pass filtering the thresholded digital image data to form low pass filtered digital image data; and
   iv) dilating the low pass filtered digital image data.

9. The method of claim 7 wherein to determine if other blemishes were caused by scratches and digs in the transmissive surface in step g) includes using area and elongation factors to classify the blemishes as scratches or digs.

10. The method of claim 7 wherein the image sensor package includes a CCD or CMOS image sensor.

11. A computer program product comprising a computer readable storage medium having a computer program stored thereon for implementing the method of claim 7.

* * * * *